United States Patent
Tang (10) Patent No.: US 10,644,887 B2
(45) Date of Patent: May 5, 2020

(54) IDENTITY VALIDITY VERIFICATION METHOD, APPARATUS AND SYSTEM

(71) Applicant: SHENZHEN GOODIX TECHNOLOGY CO., LTD., Shenzhen (CN)

(72) Inventor: Jie Tang, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/404,788

(22) Filed: May 7, 2019

(65) Prior Publication Data

US 2019/0260589 A1 Aug. 22, 2019

Related U.S. Application Data

(63) Continuation of application No. PCT/CN2017/092797, filed on Jul. 13, 2017.

(51) Int. Cl.
*H04L 9/00* (2006.01)
*H04L 9/32* (2006.01)
(Continued)

(52) U.S. Cl.
CPC .............. *H04L 9/3231* (2013.01); *G07C 9/00* (2013.01); *G08C 17/02* (2013.01); *H04L 9/0847* (2013.01);
(Continued)

(58) Field of Classification Search
CPC .................................. H04L 9/32; H04W 12/06
See application file for complete search history.

(56) References Cited

U.S. PATENT DOCUMENTS

| | | | | |
|---|---|---|---|---|
| 7,499,548 | B2 * | 3/2009 | Meandzija | H04L 63/0435 380/270 |
| 2007/0239994 | A1 * | 10/2007 | Kulkarni | G06F 21/602 713/189 |

(Continued)

FOREIGN PATENT DOCUMENTS

| | | |
|---|---|---|
| CN | 101321069 A | 12/2008 |
| CN | 202600802 U | 12/2012 |

(Continued)

OTHER PUBLICATIONS

Yongjin Lee et al. "Revised Draft Text of X.ott: Authentication framework with one-time telebiometric template; 0585", ITU-T Draft; Study Period 2009-2012, International Telecommunication Union, Geneva; CH, vol. 9/17, Sep. 23, 2009, pp. 1-34, XP017454020.

(Continued)

*Primary Examiner* — Beemnet W Dada (57) ABSTRACT

An identity validity verification method is provided. The identity validity verification method is applied to an electronic terminal and includes: acquiring biometric feature data; generating an electronic private key based on the biometric feature data; and sending the electronic private key to the access control system, such that the access control system carries out identity validity verification based on the electronic private key. According to the present application, a dedicated fingerprint identification device does not need to be arranged at a specific position, and thus fingerprint data of a user does not remain on the fingerprint identification device. In this way, convenient is brought to the user and security is enhanced.

16 Claims, 3 Drawing Sheets

(51) Int. Cl.
  *H04W 4/80* (2018.01)
  *H04W 12/04* (2009.01)
  *H04L 9/08* (2006.01)
  *H04W 12/06* (2009.01)
  *G07C 9/00* (2020.01)
  *G08C 17/02* (2006.01)
  *G06F 7/08* (2006.01)

(52) U.S. Cl.
  CPC .............. *H04L 9/0866* (2013.01); *H04L 9/32* (2013.01); *H04W 4/80* (2018.02); *H04W 12/0401* (2019.01); *H04W 12/06* (2013.01); *G06F 7/08* (2013.01)

(56) References Cited

U.S. PATENT DOCUMENTS

| | | | | |
|---|---|---|---|---|
| 2013/0042111 | A1* | 2/2013 | Fiske | H04L 9/3239 713/170 |
| 2015/0195278 | A1* | 7/2015 | Plotkin | H04L 63/0861 713/186 |
| 2017/0078260 | A1  | 3/2017 | Shen | |
| 2017/0295014 | A1* | 10/2017 | Baras | G06K 9/00006 |
| 2018/0054312 | A1* | 2/2018 | Kamal | H04L 9/3231 |

FOREIGN PATENT DOCUMENTS

| | | |
|---|---|---|
| CN | 203165055 U | 8/2013 |
| CN | 105991287 A | 10/2016 |
| CN | 205788363 U | 12/2016 |

OTHER PUBLICATIONS

Kai Xi et al. "Handbook of Information and Communication Security, Chapter 7: Bio-Cryptography", Jan. 1, 2010, Handbook of Information and Communication Security, Springer, Heidelberg [U.A.], pp. 129-157, XP002712673.

Yevgeniy Dodis et al. "Fuzzy Extractors: How to Generate Strong Keys from Biometrics and Other Noisy Data", SIAM Journal on Computing, vol. 38, No. 1, Jan. 1, 2008, pp. 97-139, XP055422104.

* cited by examiner

IDENTITY VALIDITY VERIFICATION METHOD, APPARATUS AND SYSTEM

CROSS REFERENCE TO RELATED APPLICATIONS

The present application is a continuation of international application No. PCT/CN2017/092797, filed on Jul. 13, 2017, which is hereby incorporated by reference in its entirety.

TECHNICAL FIELD

Embodiments of the present application relate to the technical field of information security, and in particular, relate to an identity validity verification method, apparatus and system.

BACKGROUND

A conventional access control system is typically unlocked by swiping an IC card, inputting passwords, calling or the like. These modes all need a zero-distance operation. With respect to the mode of swiping an IC card, the IC card may be lost and needs to be reapplied, or may be easily duplicated by other people. This not only increases management complexity and increases cost, but also causes some challenges to security. Likewise, with respect to the mode of inputting passwords, since the passwords may be easily subjected to leakage, security of the access control system may not be sufficiently ensured. Based on various defects of the conventional access control system, an access control system supported by the fingerprint identification technology comes into people's life.

Fingerprint identification is a biometric identification technology, which identifies and analyses target fingerprint features, and then make a determination. Because of uniqueness of the fingerprints, identification on the fingerprint features may be used for determining personnel information. Therefore, fingerprint identification has gained rapid developments in such relevant fields as security, management and the like. For practice of fingerprint identification, a dedicated fingerprint identification device needs to be deployed and arranged at a fixed position. As a result, fingerprint information of users may simply remain on the dedicated fingerprint identification device, and thus security risks may be caused.

SUMMARY

In view of the above, one technical problem may be solved by embodiments of the present disclosure is to provide an identity validity verification method, to address the above technical defects in the related art.

A first aspect of the present application provides an identity validity verification method, which is applied to an electronic terminal in communication with an access control system. The method includes:
   acquiring biometric feature data;
   generating an electronic private key based on the biometric feature data; and
   sending the electronic private key to the access control system, such that the access control system carries out identity validity verification based on the electronic private key.

A second aspect of the present application provides another identity validity verification method which is applied to an access control system in communication with an electronic terminal. The method includes:
   receiving an electronic private key sent by the electronic terminal; and
   paring the electronic private key with a pre-stored electronic public key to carry out identity validity verification.

A third aspect of the present application provides an identity validity verification apparatus which is applied to an electronic terminal in communication with an access control system. The apparatus includes:
   a biometric feature acquisition module, configured to acquire biometric feature data;
   a first processing module, configured to generate an electronic private key based on the biometric feature data; and
   a first communication module, configured to send the electronic private key to the access control system, such that the access control system carries out identity validity verification based on the electronic private key.

A fourth aspect of the present application provides another identity validity verification apparatus. The apparatus includes:
   a second communication module, configured to receive an electronic private key sent by the electronic terminal; and
   a second processing module, configured to pair the electronic private key with a pre-stored electronic public key to carry out identity validity verification.

A fifth aspect of the present application further provides an identity validity verification system. The system includes the apparatus according to the third aspect and the apparatus according to the fourth aspect.

As known from the above technical solutions, with the identity validity verification method, apparatus and system according to embodiments of the present application, fingerprint data of a user is acquired on an electronic terminal, and data interaction is carried out with an access control system, thereby completing identity verification for the user. As such, a dedicated fingerprint identification device does not need to be arranged at a specific position, and thus fingerprint data of a user does not remain on the fingerprint identification device. Therefore, convenient is brought to the user and security is enhanced.

BRIEF DESCRIPTION OF THE DRAWINGS

For clearer description of the technical solutions according to the embodiments of the present application or in the related art, drawings that are to be referred for description of the embodiments or the related art are briefly described hereinafter. Apparently, the drawings described hereinafter merely illustrate some embodiments of the present application. Persons of ordinary skill in the art may also derive other drawings based on the drawings described herein.

DETAILED DESCRIPTION

Nevertheless, it is not necessary to require that any technical solution according to the embodiments of the present application achieves all of the above technical effects.

For better understanding of the technical solutions of the embodiments of the present application by a person skilled in the art, the technical solutions of the present application are clearly and completely described with reference to the accompanying drawings of the embodiments of the present application. Apparently, the described embodiments are only a part of the embodiments of the present application, rather than the entire embodiments. Based on the embodiments of the present application, all other embodiments derived by persons of ordinary skill in the art without any creative efforts shall fall within the protection scope of the present application.

Specific implementations of the embodiments of the present application are further described hereinafter with reference to the accompanying drawings of the present application.

Figure 1:
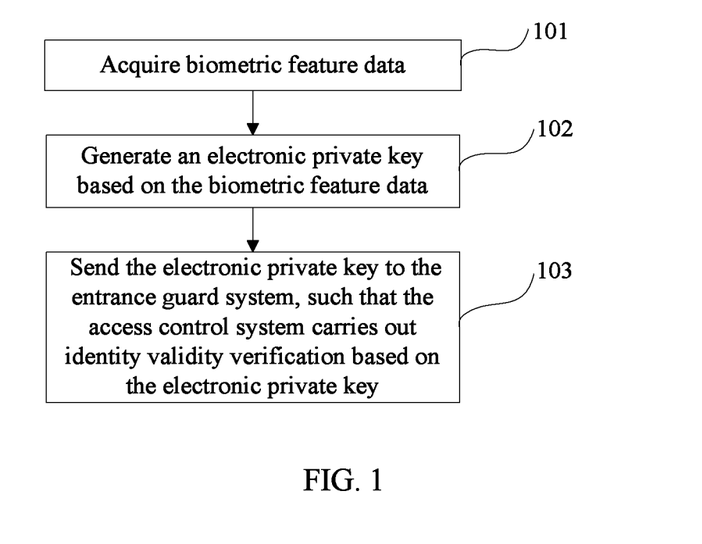
FIG. 1 is a flowchart of an identity validity verification method according to a first embodiment of the present application.

FIG. 1 is a flowchart of an identity validity verification method according to a first embodiment of the present application. The method according to this embodiment is applied to an electronic terminal in communication with an access control system, and includes the following steps:

S101: Biometric feature data is acquired.

In this embodiment, biometric feature data and fingerprint data of a user are acquired by using a biometric feature acquisition module arranged on an electronic terminal such as a smart phone. The electronic terminal herein includes, but not limited to, smart phones and tablet computers. In this embodiment and embodiments hereinafter, solutions of the present application are described using a smart phone as an example. It should be noted that the description herein is only for illustrative purposes, but shall not be understood as limitations to the solutions of the present application.

With the development of science and technologies, fingerprint chips are becoming cheaper and cheaper. It is more and more expectable that smart phones are equipped with fingerprint chips. It is more and more practical and feasible that fingerprint data of the user is acquired by using a fingerprint acquisition module. In this embodiment and embodiments hereinafter, the fingerprint acquisition module may be a biometric feature acquisition module based on electric field sensing. Correspondingly, the biometric feature data is biometric feature electric field data. In addition, the fingerprint acquisition module may also be a biometric feature acquisition module based on optical sensing. Correspondingly, the biometric feature data is biometric feature image data. The biometric feature data is mainly a pattern of fingerprint texture, but does not exclude detailed feature points of the user including the fingerprint texture acquired only from the pattern of fingerprint texture, for example, valley and ridge feature points or the like.

S102: An electronic private key is generated based on the biometric feature data.

A function mapping relationship between the biometric feature data and a first array is established. The first array is a set including a plurality of character strings. The plurality of character strings is sorted and then read by using a time pointer. That is, data, that is, the character strings, in the first array one-to-one corresponds to time segments. That is, a time segment uniquely corresponds to a character string. A time interval of the time segment may be defined according to the actual needs, for example, 60 seconds. That is, within 60 seconds, a character string is generated, and another character string is generated within next 60 seconds. Different time segments correspond to different character strings. The first array herein one-to-one corresponds to the biometric feature data. Different users correspond to different first arrays. With respect to different users, the mapping relationships between the biometric feature data and the first array are also different. As such, the generated electronic key is unique, and only corresponds to one user. Apparently, the character strings in the first array are used as an electronic private key which does not include the biometric feature data. Even if the character strings in the first array is acquired by other users, private information of the user, for example, the pattern of fingerprint texture, may not be acquired based on the acquired character strings.

Different users have different biometric feature data. With respect to different users, the corresponding first arrays are also different. Therefore, uniqueness of the electronic private key is ensured.

S103: The electronic private key is sent to the access control system, such that the access control system carries out identity validity verification based on the electronic private key.

In this embodiment, to prevent the electronic key from being intercepted during transmission, and being for identity verification and mainly used for unlocking the access control system to enter a security region without authorization, after the electronic private key is generated based on the biometric feature data, the electronic private key is encrypted on the electronic terminal, and the encrypted electronic private key is sent to the access control system via a communication module on the electronic terminal. In this way, leakage of the private data of the user is prevented, and thus security is enhanced.

Figure 2:
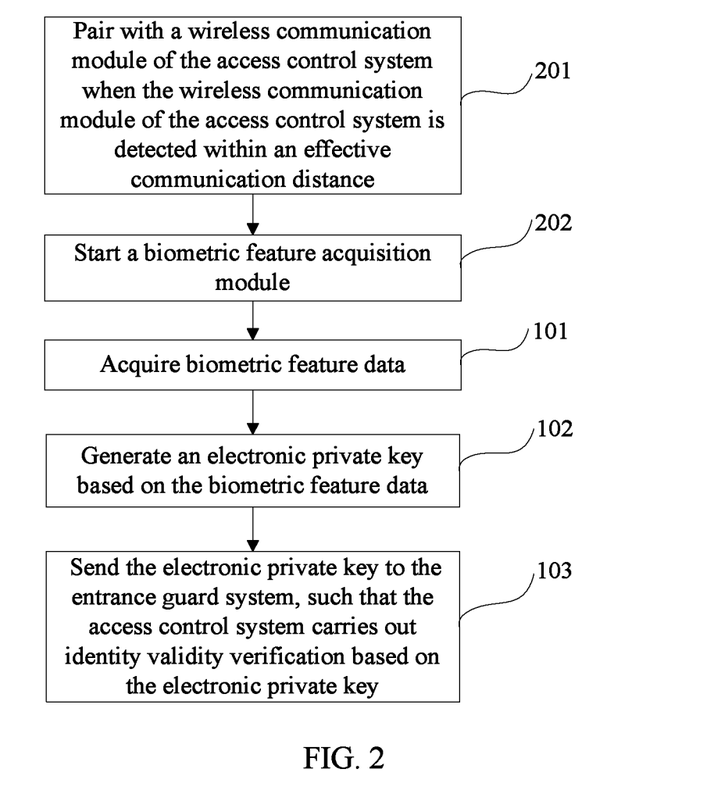
FIG. 2 is a flowchart of an identity validity verification method according to a second embodiment of the present application.

FIG. 2 is a flowchart of an identity validity verification method according to a second embodiment of the present application. This embodiment illustrates a method flowchart of identity validity verification carried out by a user after an electronic terminal automatically starts a biometric feature acquisition module when the electronic terminal matches with an access control system. In this embodiment, prior to step S101 in the first embodiment, the method may further include the following steps:

S201: Paring is carried out with a wireless communication module of the access control system when the wireless communication module of the access control system is detected within an effective communication distance.

In this embodiment, a module carrying out communication with the access control system on the electronic terminal is a wireless communication module. The wireless communication module includes a Bluetooth communication module or a visible light communication module or an infrared communication module. Correspondingly, a communication module of the access control system is a wireless communication module. The wireless communication includes a Bluetooth communication or a visible light communication module or an infrared communication module. In this embodiment, the solution according to this embodiment is described using a Bluetooth communication module as an example.

Because of unique characteristics of Bluetooth, the paring only needs to be performed once. Upon completion of the paring, the electronic terminal, for example, a smart phone, may remember the paired Bluetooth communication module. In subsequent steps, the paring does not need to be performed again. In addition, the current smart phones are mostly equipped with the Bluetooth communication module, with no need of additionally purchasing devices and materials. Therefore, cost may not be increased. When a smart phone equipped with the Bluetooth communication module approaches the access control system by a specific range, the Bluetooth communication module of the smart phone is successfully paired with a Bluetooth communication module of the access control system. In this way, the electronic terminal is connected to the access control system in a wireless mode. For example, the wireless communication module of the smart phone and the wireless communication module of the access control system enter an effective communication distance, and the smart phone automatically starts the wireless communication module to pair with the wireless communication module of the access control system.

S202: The biometric feature acquisition module is started.

After the Bluetooth communication module of the electronic terminal detects the Bluetooth communication module of the access control system and is connected to the Bluetooth communication module of the access control system, a biometric feature management page and an acquisition prompt item are loaded on the electronic terminal to prompt the user to input fingerprints and start the biometric feature acquisition module. The user may press against the biometric feature acquisition module with a finger, such that the electronic terminal acquires biometric feature data of the user and thus generates a corresponding electronic private key.

Optionally, in this embodiment, the biometric feature acquisition module is a fingerprint acquisition module based on optical sensing, and correspondingly, the biometric feature data is biometric feature image data. Alternatively, the biometric feature acquisition module is a fingerprint acquisition module based on electric field sensing, and correspondingly, the biometric feature data is biometric feature electric field data. When the acquired biometric feature data is a fingerprint pattern, the fingerprint pattern may include break points, bifurcation points and turning points. These break points, bifurcation points and turning points are used for identifying features in the fingerprint pattern. Therefore, these break points, bifurcation points and turning points need to be extracted from the acquired fingerprint pattern. That is, effective biometric feature data needs to be generated based on the biometric feature data, and an electronic public key needs to be generated based on the effective biometric feature data.

With the identity validity verification method applied to an electronic terminal according to the above embodiments of the present application, fingerprint data of a user is acquired on an electronic terminal, and data interaction is carried out with an access control system, thereby completing identity verification for the user. As such, a dedicated fingerprint identification device does not need to be arranged at a specific position, and thus fingerprint data of a user does not remain on the fingerprint identification device. Therefore, convenient is brought to the user and security is enhanced.

Figure 3:
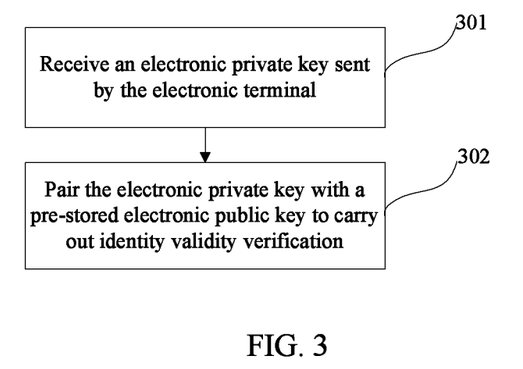
FIG. 3 is a flowchart of an identity validity verification method according to a third embodiment of the present application.

FIG. 3 is a flowchart of an identity validity verification method according to a third embodiment of the present application. The method according to this embodiment is applied to an access control system, and includes the following steps:

S301: An electronic private key sent by an electronic terminal is received.

After the electronic terminal matches with the access control system, the access control system may receive an electronic private key sent by the electronic terminal One electronic private key corresponds to one user.

S302: The electronic private key is pared with a pre-stored electronic public key to carry out identity validity verification.

It should be noted that before unlocking the access control system, a user needs to register his or her personal information in the access control system. In this embodiment, the electronic public key including biometric feature data is pre-stored in the access control system, and the electronic public key is generated by the electronic terminal After the biometric data of the user is pre-acquired by the electronic terminal, a function mapping relationship between the biometric data and a second array including a plurality of character strings is established, the plurality of character strings is sorted and read by using a time pointer and the read character strings are used as the electronic public key, or the read character strings are transformed and the transformed character strings are used as the electronic public key. The access control system stores the electronic public key. Description is given using a scenario where the biometric feature data is a fingerprint pattern as an example. That is, the user needs to firstly acquires the fingerprint data (fingerprint pattern) of the user via an electronic device, for example, a smart phone.

An electronic public key is generated and then sent to the access control system; the access control system receives the electronic public key sent by the smart phone stores the electronic public key to match with the electronic private key to perform identity validity verification for the user. In this way, the access control system only stores the electronic public key corresponding to the user, but does not store the fingerprint data of the user. This further prevents the fingerprint data of the user from leakage, and thus enhances security. That is, the access control system only locally stores the electronic public key, but does not store the biometric feature data. In this embodiment, the access control system may further extract effective biometric features in the fingerprint data, that is, break points, bifurcation points and turning points in the fingerprint pattern, and generate the electronic public key based on the break points, bifurcation points and turning points in the fingerprint pattern.

In addition, since the electronic terminal is capable of encrypting the electronic private key, when the electronic private key received by the access control system is an electronic private key encrypted by the electronic terminal, the access control system decrypts the encrypted electronic private key, and pair the decrypted electronic private key with the electronic public key stored in the access control system. If the paring is successful, it is determined that the user is authorized. In this case, the fingerprint data of the user may be used for unlocking the access control system. If the paring fails, it is determined that the user is unauthorized. In this case, the fingerprint data of the user may not be used for unlocking the access control system.

Specifically, the paring the decrypted electronic private key with the electronic public key includes: generating a paring credential based on the decrypted private key and the electronic public key locally stored in the access control system, where the paring credential is generated by using a generation algorithm pre-stored in the access control system corresponding to the generation algorithm of the paring credential, and the access control system pre-stores a credential verification rule; after the paring credential is generated, verifying the paring credential based on the predefined credential verification rule; and performing identity validity verification for the user based on a verification result. When the paring credential matches with the credential verification rule, it is determined that the verification is successful and the user is authorized. In this case, the electronic private key sent by the user via the electronic terminal may be used for unlocking the access control system, and meanwhile, the access control system is unlocked such that the user is allowed to access the system. When the verification fails, the user is unauthorized. In this case, the electronic public key sent by the user via the electronic terminal may not be used for unlocking the access control system, and meanwhile, the access control system fails to be unlocked such that the user is not allowed to access the system.

Figure 4:
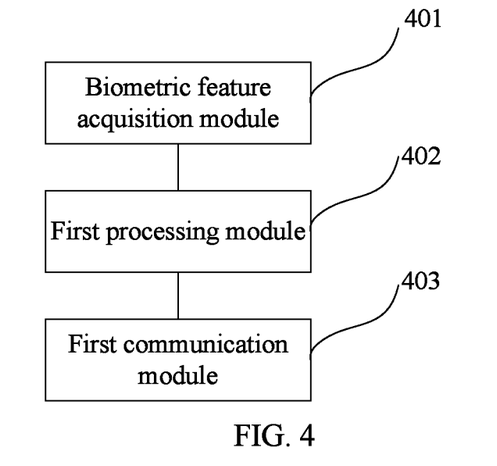
FIG. 4 is a structural diagram of an identity validity verification apparatus according to a fourth embodiment of the present application.

FIG. 4 is a structural diagram of an identity validity verification apparatus according to a fourth embodiment of the present application. In this embodiment, the identity validity verification apparatus mainly refers to electronic terminals such as smart phones. The identity validity verification apparatus in this embodiment includes a biometric feature acquisition module 401, a first processing module 402 and a first communication module 403. The biometric feature acquisition module 401 is configured to acquire biometric feature data of a user. The first processing module 402 is configured to identity the acquired biometric feature data, and generate an electronic private key. The first communication module 403 is configured to be connected to a communication module of an access control system and perform data interaction, for example, sending the electronic private key to the access control system. The first communication module 403 may be specifically a wireless communication chip, for example, a Bluetooth chip.

In addition, the first processing module 402 is further configured to perform texture feature identification for the acquired biometric feature data, or perform texture feature identification for acquired biometric feature electric field data.

In addition, when detecting the communication module of the access control system within an effective communication distance, the first communication module 403 of the electronic terminal is pared with the communication module of the access control system. After the first communication module 403 is successfully paired with the communication module of the access control system, a biometric feature management page and an acquisition prompt item are loaded on the electronic terminal, and the biometric feature acquisition module 401 arranged on the electronic terminal is started to acquire the biometric feature data.

As an embodiment of the present application, the first processing module 402 further includes an establishing submodule and a selecting submodule. The establishing submodule is configured to establish a function mapping relationship between the biometric feature data and a first array including a plurality of character strings. The selecting submodule is configured to sort the plurality of character strings and read the character strings by using a time pointer, and use the read character strings as the electronic private key, or transform the read character strings and use the transformed character strings as the electronic private key.

Figure 5:
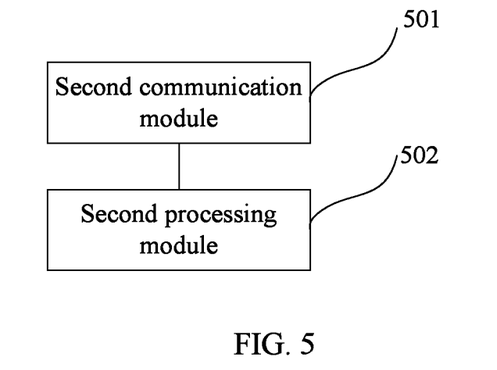
FIG. 5 is a structural diagram of an identity validity verification apparatus according to a fifth embodiment of the present application.

FIG. 5 is a structural diagram of an identity validity verification apparatus according to a fifth embodiment of the present application. In this embodiment, the identity validity verification apparatus may be an access control system. The identity validity verification apparatus in this embodiment includes a second communication module 501 and a second processing module 502. The second communication module 501 corresponds to the first communication module 403 in the fourth embodiment, and is mainly configured to be matched and connected to a communication chip of an electronic terminal and carry out data interaction. The second communication module 501 may be likewise a Bluetooth module. The second processing module 502 is configured to pair an electronic private key with a pre-stored electronic public key to carry out identity validity verification for a user based on biometric feature data thereof.

In addition, the electronic public key is generated by the electronic terminal. After the biometric feature data is pre-acquired by the electronic terminal, a function mapping relationship between the biometric feature data and a second array including a plurality of character strings is established, the plurality of character strings is sorted and read by using a time pointer and the read character strings are used as the electronic public key, or the read character strings are transformed and the transformed character strings are used as the electronic public key.

In some specific embodiments of the present application, the second processing module 502 includes a generating submodule and a verification submodule. The generating submodule is configured to generate a paring credential based on an encrypted electronic private key and an electronic public key stored locally in the access control system. The verification submodule is configured to verify the paring credential based on a predefined credential verification rule, and carry out the identity validity verification based on a verification result.

Figure 6:
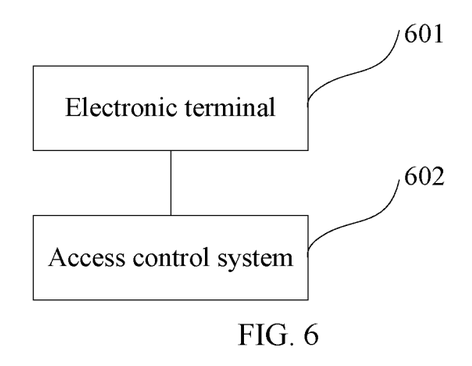
FIG. 6 is a structural diagram of an identity validity verification system according to a sixth embodiment of the present application.

FIG. 6 is a structural diagram of an identity validity verification system according to a sixth embodiment of the present application. The identity validity verification system in this embodiment includes an electronic terminal 601 in the fourth embodiment and the other relevant embodiments, and an access control system 602 in the fifth embodiment and the other relevant embodiments.

The electronic terminal 601 is configured to acquire biometric feature data by using a biometric feature acquisition module, and identify the acquired biometric feature data, generate an electronic private key and encrypt the electronic private key. An electronic public key stored in the access control system 602 is paired with the electronic private key, and identity validity verification is carried out for a user corresponding to the biometric feature data. This prevents private data of the user from leakage, and meanwhile enhances security of the access control system.

The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

The electronic terminal in the embodiments of the present application is practiced in various forms, including, but not limited to:

(1) a mobile communication device: which has the mobile communication function and is intended to provide mainly voice and data communications; such terminals include: a smart phone (for example, an iPhone), a multimedia mobile phone, a functional mobile phone, a low-end mobile phone and the like;

(2) an ultra mobile personal computer device: which pertains to the category of personal computers and has the computing and processing functions, and additionally has the mobile Internet access feature; such terminals include: a PDA, an MID, an UMPC device and the like, for example, an iPad;

(3) a portable entertainment device: which displays and plays multimedia content; such devices include: an audio or video player (for example, an iPod), a palm game machine, an electronic book, and a smart toy, and a portable vehicle-mounted navigation device;

(4) a server: which provides services for computers, and includes a processor, a hard disk, a memory, a system bus and the like; the server is similar to the general computer in terms of architecture; however, since more reliable services need to be provided, higher requirements are imposed on the processing capability, stability, reliability, security, extensibility, manageability and the like of the device; and (5) another electronic device having the data interaction function.

The above described apparatus embodiments are merely for illustration purpose only. The modules which are described as separate components may be physically separated or may be not physically separated, and the components which are illustrated as modules may be or may not be physical modules, that is, the components may be located in the same position or may be distributed into a plurality of network modules. A part or all of the modules may be selected according to the actual needs to achieve the objectives of the technical solutions of the embodiments. Persons of ordinary skill in the art may understand and implement the present disclosure without paying any creative effort.

According to the above embodiments of the present disclosure, a person skilled in the art may clearly understand that the embodiments of the present disclosure may be implemented by means of hardware or by means of software plus a necessary general hardware platform. Based on such understanding, portions of the technical solutions of the present disclosure that essentially contribute to the related art may be embodied in the form of a software product, the computer software product may be stored in a computer readable storage medium. The computer-readable storage medium includes any mechanism for storing or transferring information in a computer readable form. For example, the computer-readable medium includes a read-only memory (ROM), a random access memory (RAM), a disk storage medium, an optical storage medium, a flash storage medium, electricity, light, sound and other forms of propagation signals (for example, a carrier, an infrared signal, a digital signal and the like), and the like. The computer software product includes several instructions for instructing a computer device (which may be a personal computer, a server, or a network device) to perform all the embodiments or some parts of the embodiments.

Finally, it should be noted that the above embodiments are merely intended to describe the technical solutions of the embodiments of the present application, instead of limiting the present application. Although the present application is described in detail with reference to the above embodiments, persons of ordinary skill in the art should understand that various modifications may be made to the technical solutions described in the above embodiments or equivalent replacements may be made to some technical features thereof, without departing from the spirit and scope of the technical solutions of the embodiments of the present application.

A person skilled in the art shall understand that the embodiments may be described to illustrate methods, apparatuses (devices), or computer program products. Therefore, hardware embodiments, software embodiments, or hardware-plus-software embodiments may be used to illustrate the embodiments of the present application. In addition, the embodiments of the present application may further employ a computer program product which may be implemented by at least one computer-readable storage medium with an executable program code stored thereon. The computer-readable storage medium includes, but not limited to, a disk memory, a CD-ROM, an optical memory and the like.

The embodiments of the present application are described based on the flowcharts and/or block diagrams of the method, apparatus (device), and computer program product according to the embodiments of the present application. It should be understood that each process and/or block in the flowcharts and/or block diagrams, and any combination of the processes and/or blocks in the flowcharts and/or block diagrams may be implemented using computer program instructions. These computer program instructions may be issued to a computer, a dedicated computer, an embedded processor, or processors of other programmable data processing device to generate a machine, which enables the computer or the processors of other programmable data processing devices to execute the instructions to implement an apparatus for implementing specific functions in at least one process in the flowcharts and/or at least one block in the block diagrams.

These computer program instructions may also be stored a computer-readable memory capable of causing a computer or other programmable data processing devices to work in a specific mode, such that the instructions stored on the computer-readable memory implement a product including an instruction apparatus, where the instruction apparatus implements specific functions in at least one process in the flowcharts and/or at least one block in the block diagrams.

These computer program instructions may also be stored on a computer or other programmable data processing devices, such that the computer or the other programmable data processing devices execute a series of operations or steps to implement processing of the computer. In this way, the instructions, when executed on the computer or the other programmable data processing devices, implement the specific functions in at least one process in the flowcharts and/or at least one block in the block diagrams.

What is claimed is:

1. An identity validity verification method, applied to an electronic terminal in communication with an access control system, wherein the method comprises:
   acquiring biometric feature data;
   generating an electronic private key based on the biometric feature data; and
   sending the electronic private key to the access control system to make the access control system carries out identity validity verification based on the electronic private key,
   wherein the generating an electronic private key based on the biometric feature data comprises:
   establishing a function mapping relationship between the biometric feature data and a first array comprising a plurality of character strings; and
   sorting the plurality of character strings and reading the character strings by using a time pointer and using the read character strings as the electronic private key, or transforming the read character strings and using the transformed character strings as the electronic private key.

2. The method according to claim 1, wherein the acquiring biometric feature data comprises: acquiring the biometric feature data by using a biometric feature acquisition module arranged on the electronic terminal.

3. The method according to claim 2, wherein the biometric feature acquisition module is a biometric feature acquisition module based on optical sensing, and correspondingly the biometric feature data is biometric feature image data.

4. The method according to claim 2, wherein the biometric feature acquisition module is a biometric feature acquisition module based on electric field sensing, and correspondingly the biometric feature data is biometric feature electric field data.

5. The method according to claim 1, wherein prior to the acquiring biometric feature data, the method further comprises:
paring with a wireless communication module of the access control system when the wireless communication module of the access control system is detected within an effective communication distance.

6. The method according to claim 1, wherein the generating an electronic private key based on the biometric feature data comprises:
generating effective biometric feature data based on the biometric feature data, and generating the electronic private key based on the effective biometric feature data.

7. The method according to claim 1, wherein the sending the electronic private key to the access control system comprises: sending the electronic private key to the access control system via Bluetooth.

8. An identity validity verification method, applied to an access control system in communication with an electronic terminal, wherein the method comprises:
receiving an electronic private key sent by the electronic terminal; and
paring the electronic private key with a pre-stored electronic public key to carry out identity validity verification, wherein the private key is generated based on biometric feature data collected by the electronic terminal,
wherein the electronic public key is generated by:
establishing a function mapping relationship between the biometric feature data and a second array comprising a plurality of character strings after the electronic terminal acquires the biometric feature data; and
sorting the plurality of character strings and reading the character strings by using a time pointer, and using the read character strings as the electronic public key, or transforming the read character strings and using the transformed character strings as the electronic public key.

9. The method according to claim 8, wherein prior to the receiving an electronic private key sent by the electronic terminal, the method further comprises:
receiving an electronic public key sent by the electronic terminal, and storing the electronic public key.

10. The method according to claim 8, wherein the paring the electronic private key with a pre-stored electronic public key comprises:
generating a paring credential based on the electronic private key and the pre-stored electronic public key; and
verifying the paring credential based on a predefined credential verification rule to carry out the identity validity verification.

11. An identity validity verification apparatus, applied to an electronic terminal in communication with an access control system, wherein the apparatus comprises:
a biometric feature acquisition module, configured to acquire biometric feature data;
a first processing module, configured to generate an electronic private key based on the biometric feature data; and
a first communication module, configured to send the electronic private key to the access control system to make the access control system carries out identity validity verification based on the electronic private key,
wherein the first processing module comprises:
an establishing submodule, configured to establish a function mapping relationship between the biometric feature data and a first array comprising a plurality of character strings; and
a selecting submodule, configured to sort the plurality of character strings and read the character strings by using a time pointer, and use the read character strings as the electronic private key, or transform the read character strings and use the transformed character strings as the electronic private key.

12. The apparatus according to claim 11, wherein the biometric feature acquisition module is a biometric feature acquisition module based on optical sensing, and correspondingly the biometric feature data is biometric feature image data.

13. The apparatus according to claim 11, wherein the biometric feature acquisition module is a biometric feature acquisition module based on electric field sensing, and correspondingly the biometric feature data is biometric feature electric field data.

14. The apparatus according to claim 11, wherein the first communication module is further configured to: pare with a wireless communication module of the access control system when the wireless communication module of the access control system is detected within an effective communication distance.

15. The apparatus according to claim 11, wherein the first processing module is further configured to: generate effective biometric feature data based on the biometric feature data, and generate the electronic private key based on the effective biometric feature data.

16. The apparatus according to claim 11, wherein the first communication module is a Bluetooth chip, wherein the Bluetooth chip is configured to send the electronic private key to the access control system.

* * * * *